Patented Feb. 15, 1938

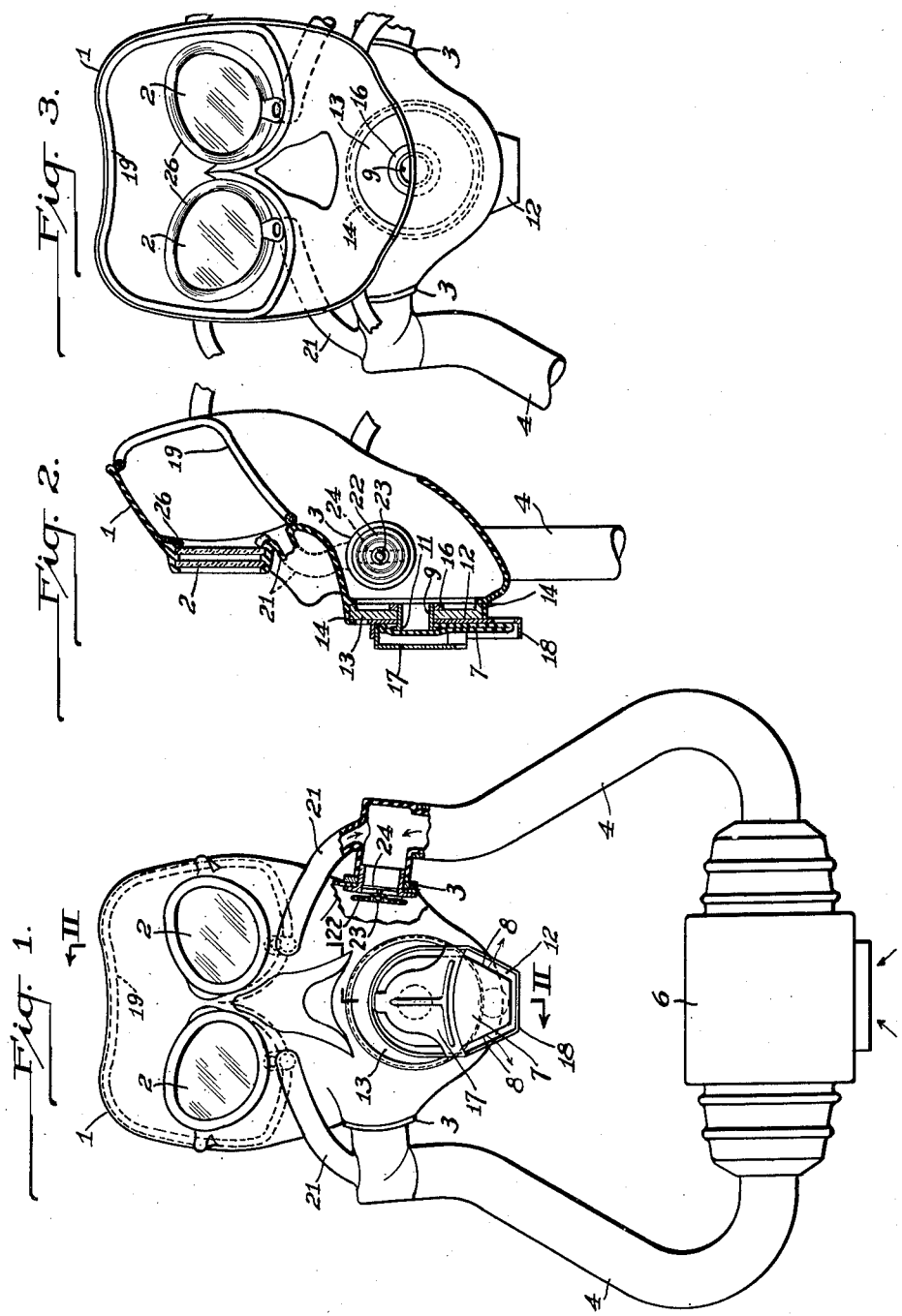

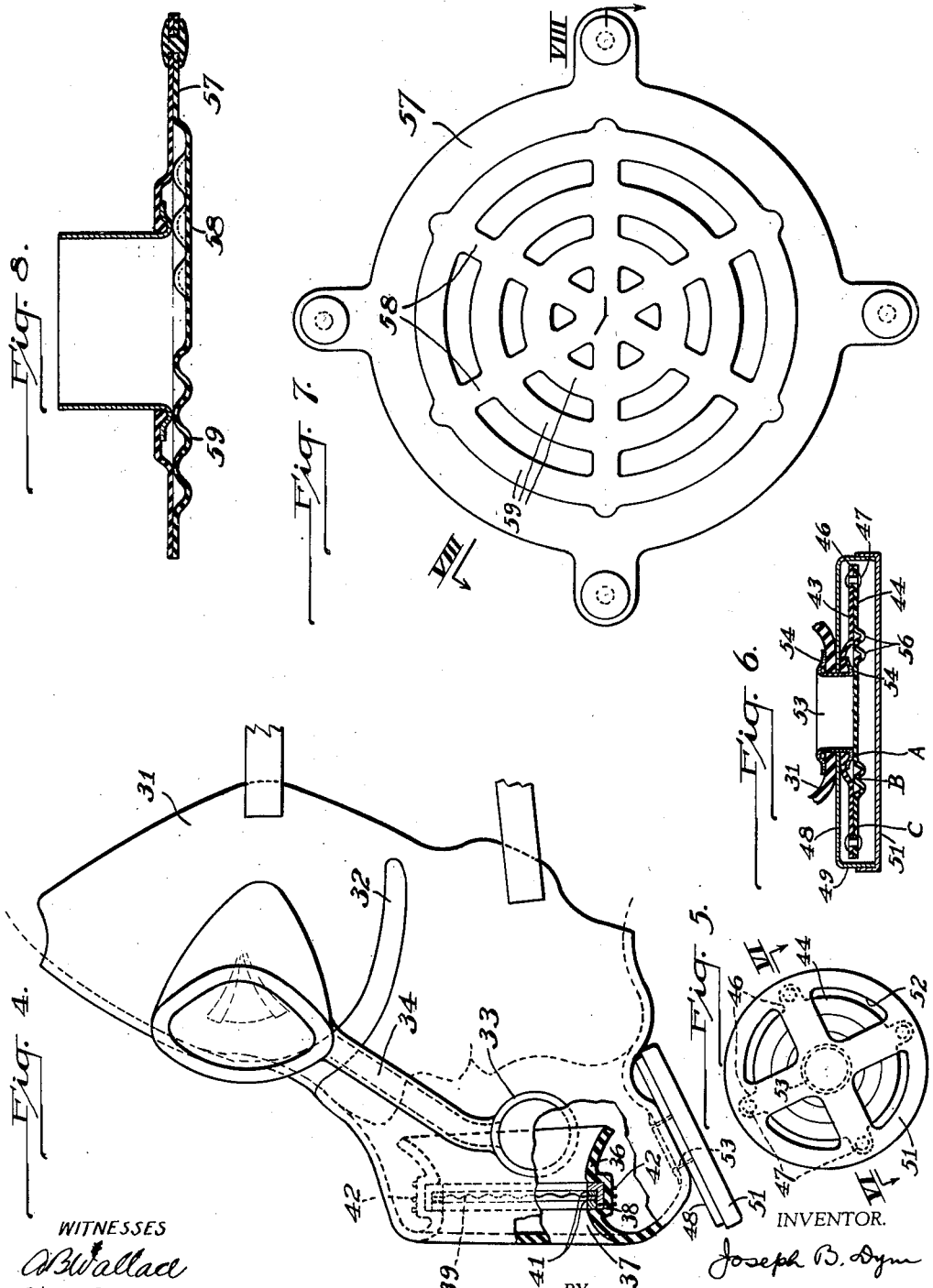

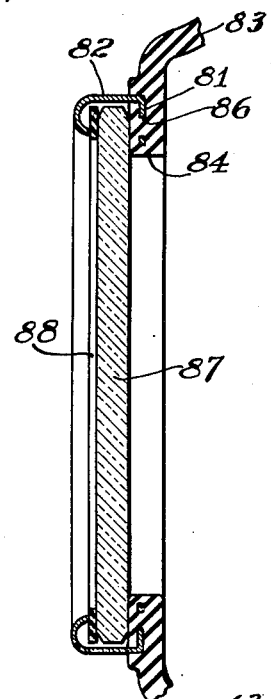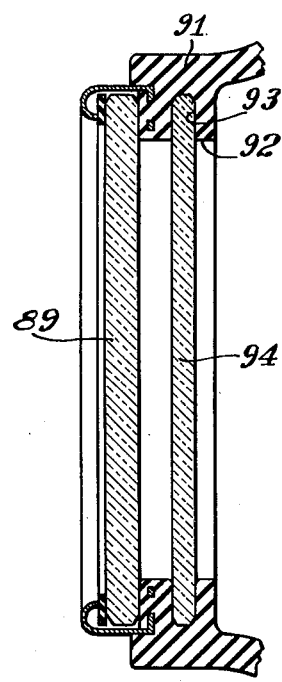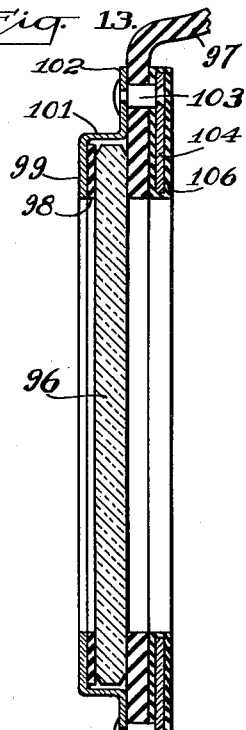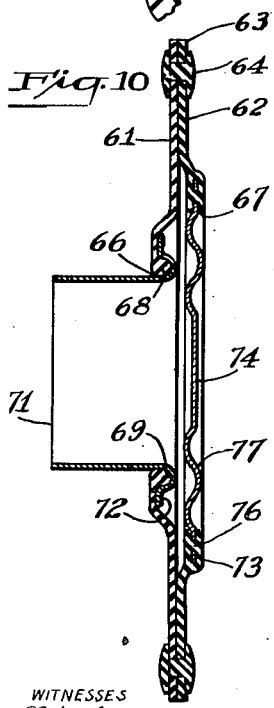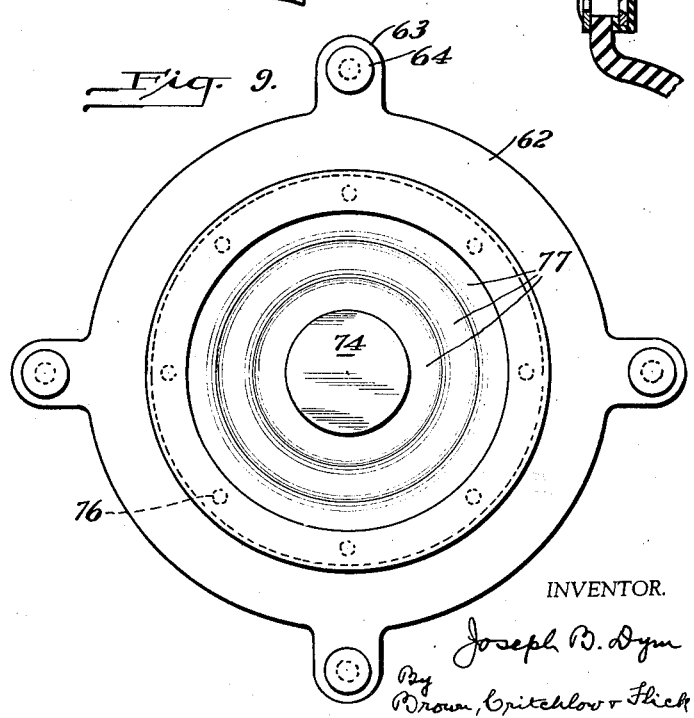

2,108,256

UNITED STATES PATENT OFFICE 2,108,256

BREATHING APPARATUS

Joseph B. Dym, Pittsburgh, Pa., assignor to Mine Safety Appliances Company, Pittsburgh, Pa., a corporation of Pennsylvania Application May 13, 1936, Serial No. 79,509

11 Claims. (Cl. 128—141)

This invention relates to breathing apparatus of the type which includes a face-piece, or mask, that covers the entire face of the wearer.

A serious problem in the use of such breathing apparatus is the fogging of the eye-pieces or lenses with which the face-piece is provided. This fogging is due to moisture in the air in the face-piece condensing on the inner surfaces of the cool lenses where it can not be wiped off without removing the mask. Fogged lenses obscure the vision of the wearer, and make it dangerous as well as difficult for him to move about, as will be easily understood.

Another problem encountered by the wearer of breathing apparatus is to make himself heard intelligibly through the mask without undue effort in speaking.

Still further trouble has been met with in attempting to provide a dependable exhalation valve that will function properly under all conditions, and to provide a satisfactory lens mounting that tightly and permanently seals the lenses against leakage of gases around them.

It is an object of this invention to provide breathing apparatus in which fogging of the inner surfaces of the lenses is minimized or eliminated.

Another object is to provide a gas-tight mask through which the wearer can be easily heard.

A further object is to provide an exhalation valve of durable construction which is dependable and satisfactory in operation at all times.

A still further object is to provide lens mountings by which the lenses are tightly and permanently sealed against leakage of gases past them.

The invention is illustrated in the accompanying drawings in which Fig. 1 is a front view of breathing apparatus incorporating the preferred embodiment of some of the features of this invention; Fig. 2 is a vertical section through the mask taken on the line II—II of Fig. 1; Fig. 3 is a rear view of the mask; Fig. 4 is a side view, partly broken away, of a modification of this invention; Fig. 5 is a bottom plan view of the exhalation valve and guard shown in Fig. 4; Fig. 6 is an enlarged vertical section through the valve taken on the line VI—VI of Fig. 5; Fig. 7 is a bottom plan view of a modification of the exhalation valve; Fig. 8 is a vertical section thereof taken on the line VIII—VIII of Fig. 7; Fig. 9 is a front view of a combined exhalation valve and speaking diaphragm; Fig. 10 is a vertical section through the center thereof; and Figs. 11, 12 and 13 are vertical sections through three forms of lens mountings.

Referring to Figs. 1 to 3, a face-piece 1 of rubber or other suitable flexible and gas-impervious material is provided in its upper portion with eye-pieces or lenses 2, and at the sides of its forwardly projecting lower portion with tubular fittings 3 to which flexible air hoses 4 are connected. The outer ends of the hoses are connected to a canister 6 containing suitable air-purifying material, advantageously a canister of the type well known in the art. Although two fittings and hoses have been shown, it will be understood that a single hose may be used if desired.

Mounted on the lower portion of the face-piece, preferably directly in front of the mouth of the wearer, is an exhalation valve 7 of the flutter type, e. g., as shown in Patent No. 1,515,645 to Yablick. This valve consists of two superimposed strips of pliable rubber united at their edges except along their lower side edges 8. As shown in Fig. 2, the inner strip has an opening therethrough in which is disposed a tubular coupling 9 the valve end of which is provided with an annular flange 11 projecting between the two sections of the valve. The other end of the coupling projects through registering openings in a metal plate 12 and a metal disc 13 which is mounted and sealed in an annular groove 14 formed in the wall of an opening in the lower front portion of the face-piece. To clamp these various members together, a nut 16 is threaded on the inner end of the coupling. The exhalation valve is protected from injury, especially while the breathing apparatus is not in use, by a metal guard, or cage, 17 attached to a flange 18 extending forwardly from plate 12. Cage 17 also acts to prevent the flutter valve from being accidentally clamped shut when the mask is in use.

A particular feature of this invention is the provision of means for preventing the inner surfaces of the lenses from fogging due to the condensation of moisture thereon. A large part of the moisture in the mask is due to the moisture contained in exhaled air, and in accordance with the invention the exhaled air is prevented from coming in contact with the lenses by dividing the face-piece into two compartments sealed from each other, one containing the lenses and the other the air inlets and exhalation valve. Advantageously this is accomplished by means of a flexible strip, such as a small rubber tube 19, cemented to the inner surface of the face-piece in such position as to snugly engage the face of a wearer around his eyes and over the bridge of his nose, as shown in Fig. 3. However, it has been found that this alone does not always prevent fogging, because the air in the eye compartment takes up moisture given off by the skin, and this moisture may condense on the lenses.

Therefore, to remove moisture from the air in the eye compartment, a tube 21 is connected between the upper end of each hose 4 outside of the face-piece and the eye compartment preferably directly below the overlying lens. When the wearer inhales, some of the moist air in the eye compartment is drawn through tubes 21 into the breathing compartment through fittings 3 along with the dry air from the canister.

To prevent exhalation through the air hose, and particularly to prevent moist breath from entering the eye compartment through tubes 21 when the wearer exhales, check valves are provided that are preferably in the form of flexible rubber discs 22 slidably mounted on headed pins 23 projecting inwardly from cross-pieces 24 mounted in fittings 3. These valves make it unnecessary to have check valves in the canister to prevent exhaled air from passing through the canister on which such air has a detrimental effect. The air pressure in the sealed eye compartment is reduced during inhalation, creating a partial vacuum therein. When exhalation commences valves 22 close and the reduced pressure in the eye compartment causes dry air from the canister to enter the eye compartment. This incoming dry air reduces the remaining moisture content of the air in the eye compartment to a point where it does not fog the lenses. It will be noted that although tubes 21 connect the eye and breathing compartments, these compartments are in actual communication with each other only when the wearer is inhaling, but at those times moist breath can not enter the eye compartment because the wearer is inhaling and drawing air away from the eye compartment. When he exhales valves 22 are closed, thereby cutting off communication between the breathing and eye compartments.

Elimination of lens fogging during very cold weather and other conditions tending to cause fogging is aided, as shown in Fig. 2, by using double lenses spaced apart to provide an insulating layer of dead air between them.

To absorb perspiration on the face of the wearer around his eyes, absorbent material such as felt or sponge rubber 26 may be secured to the face-piece around each lens opening as shown in Figs. 2 and 3. Excess perspiration can drain away through tubes 21.

At certain voice frequencies the ordinary mask apparently partially absorbs the sound waves and thereby reduces the intensity of the wearer's voice, even with the speaking diaphragm removed. It has been found that this difficulty is overcome to a large extent with the present mask in which the breathing or speaking compartment is sealed from the eye compartment.

In Fig. 4 there is shown a different type of mask embodying this invention. In this embodiment eye and breathing compartments are formed in a face-piece 31 preferably by an inwardly projecting pliable rib 32 molded into the face-piece for snugly engaging the face of the wearer, but the eye compartment is connected with air hoses 33 by air tubes 34 in the same manner as previously described. The mask shown in this figure is especially suitable for use by people who find it necessary to talk while wearing breathing apparatus, as it is formed for transmitting the voice clearly to others without undue effort on the part of the speaker. Accordingly, the lower front portion of the face-piece has an inwardly projecting portion 36 provided with a tubular opening 37 therethrough. The wall of this opening at its opposite ends flares outwardly like the bell of a horn or a telephone transmitter, while its intermediate portion is provided with an annular recess 38 in which a speaking diaphragm 39 is mounted. The diaphragm is preferably a thin metal plate provided with concentric annular corrugations for increasing its flexibility, and is clamped between a pair of clamping rings 41 disposed in recess 38 where they are sealed securely in place by binding the surrounding wall of the recess with wire 42 or the like.

The wearer of this mask speaks directly into the flared transmitter-like mouth-piece, and the metal diaphragm transmits his speech clearly to the outside of the face-piece. The flared portion of the face-piece outside the diaphragm aids in transmitting speech by its megaphone effect, while it will be noted that there is nothing to interfere with the speaking diaphragm or its operation, as has often been the case heretofore. Inwardly projecting portion 36 of the face-piece serves as a shock absorber in case the wearer is struck in the face, and prevents the metal diaphragm from hitting his lips and teeth.

As the speaking diaphragm occupies the front of the face-piece, the exhalation valve is suspended from the chin portion of the face-piece. In the past it has been difficult to obtain exhalation valves having a minimum resistance to exhalation while being tightly closed at all other times. The valve shown in Figs. 4, 5 and 6 overcomes these difficulties. As shown in Fig. 6, it is formed from a pair of superimposed flexible rubber diaphragms 43 and 44 having peripheral ears 46 joined together by rubber rivets 47, and is disposed in a shallow metal receptacle 48 over the annular flange 49 of which a cover guard 51 is fitted. The cover is provided with openings 52 (Fig. 5) through which air escapes from the valve. Prior to forming the valve the individual diaphragms and rivets are preferably semi-cured, and after they are assembled they are finish-cured to mold ears 46 and the rivets into one piece.

Inner diaphragm 43, receptacle 48 and the adjoining portion of the face-piece are provided with registering openings through which a tubular coupling 53 extends. The opposite ends of this coupling are provided with flanges 54 for clamping the inner diaphragm of the valve tightly to the face-piece. The flange-engaging portion of this diaphragm is offset toward the face-piece, as shown in Fig. 6, to allow the outer diaphragm to lie flush against the rest of the inner one, while the outer diaphragm is provided with concentric annular corrugations 56 which add to its flexibility. In a valve of this construction there are three different sealing areas, indicated in Fig. 6 by the letters A, B and C, which substantially eliminate leakage back through the valve and into the face-piece. Exhaled air spreads the rubber diaphragms apart and escapes from them along their edges between ears 46. Preferably, the valve is suspended at an angle, as shown in Fig. 4, to permit moisture accumulating in the bottom of the face-piece to drain out easily through the valve.

In Figs. 7 and 8 there is shown an exhalation valve of the same type as that just described, but, in addition, the outer rubber diaphragm 57 is provided with radial corrugations 58 traversing its annular corrugations 59. It has been found that with this arrangement of radial and annular corrugations the valve flexes more easily and is highly responsive to inhalation and exhalation.

A combination valve and speaking diaphragm, which can be used conveniently with the face-piece shown in Fig. 1, is illustrated in Figs. 9 and 10. This member is formed from two flexible rubber diaphragms 61 and 62 disposed face to face and having peripheral ears 63 connected together by rubber rivets 64 in the manner previously described. The central portions of the diaphragms are offset away from each other and are provided with openings 66 and 67. Opening 66 is encircled by a bead 68 which is retained in an annular groove 69 formed between one end of a tubular coupling 71 and its outwardly projecting flange 72. The wall of opening 67 in the outer diaphragm is provided with an annular groove 73 in which is inserted the edge portion of a metal disc 74 forming a speaking diaphragm. The inserted portion of the disc is provided with holes 76 into which the rubber of the rubber diaphragms flows when the disc and diaphragms are vulcanized together. The metal disc is also preferably provided with annular corrugations 77 to increase its responsiveness to sound vibrations, while the offset portions of the rubber diaphragms assure the speaking diaphragm of unrestricted vibration. Exhaled air escapes through this combination member along its edge between the rubber rivets. With this member the advantages of a speaking diaphragm are obtained without requiring the use of a separate exhalation valve.

Figs. 11 to 13 represent three types of lens mountings which are provided by this invention and which can be used in connection with the face-pieces described. According to Fig. 11, the inwardly projecting flange 81 of a metal lens frame 82 is molded into the face-piece 83 around the eye opening 84. The flange is provided with a plurality of holes 86 through which the rubber of the face-piece flows for securely holding the frame in place. A glass lens 87, disposed in the frame, is clamped tightly in place between the face-piece and a rubber gasket 88, disposed against the outer surface of the lens, by the outer end of the frame which is turned inwardly against the gasket as shown. With this construction the lens is held securely in place by metal backing, rather than by the flexible wall of the eye-piece opening with the aid of an adhesive.

This same type of mounting is used for the outer lens 89 shown in Fig. 12. However, in this case, the wall 91 of the eye opening 92 extends outwardly to form a portion thick enough to accommodate an annular recess 93 spaced from lens 89 and in which a second lens 94 is mounted and sealed by a suitable adhesive. This construction protects the eyes and life of the wearer in case the outer lens is broken, reduces fogging by insulating with a layer of dead air the thinner lens from cold outside temperatures, and provides an additional seal against leakage of poisonous gases inwardly through the eye-piece opening.

In the lens mounting shown in Fig. 13 a lens 96 is tightly clamped between a face-piece 97 and a sealing gasket 98 by the inwardly projecting outer flange 99 of a metal frame 101. This frame has an outwardly projecting inner flange 102 engaging the face-piece and through which the outer ends of metal rivets 103 project. The inner ends of these rivets are anchored in a metal ring 104 inside the face-piece, whereby the compression on the rivets clamps the outer flange of frame 101 against the lens and maintains it airtight. Ring 104 is preferably completely enclosed by a layer of rubber 106 for the purpose of protection.

Breathing apparatus constructed in accordance with this invention is very safe and satisfactory in use, because the vision of the wearer is not obstructed by fogged lenses, the exhalation valve functions properly at all times, the lenses do not become loose in their mountings, and the speech of the wearer can be distinctly understood through the mask without undue effort in speaking on his part.

According to the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Breathing apparatus comprising a face-piece, an eye-piece mounted therein, an air hose connected at one end to said face-piece, means associated with the interior of said face-piece and adapted to engage the face of a wearer for dividing the face-piece into eye and breathing compartments sealed from each other, a tube connecting said hose to said eye compartment, a check valve mounted in said hose between said tube and breathing compartment, and an exhalation valve associated with said breathing compartment.

2. Breathing apparatus comprising a face-piece, an eye-piece mounted therein, an air hose connected at one end to said face-piece, said face-piece being provided with a transversely extending rib integral therewith and projecting inwardly to engage the face of a wearer for dividing the face-piece into eye and breathing compartments sealed from each other, a tube connecting said hose to said eye compartment, a check valve mounted in said hose between said tube and breathing compartment, and an exhalation valve connected to said face-piece and opening out of said breathing compartment.

3. Breathing apparatus comprising a face-piece, an eye-piece mounted therein, means associated with said eye-piece adapted to absorb perspiration around the eyes of a wearer, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, and an exhalation valve connected to said face-piece and opening out of said breathing compartment.

4. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, an exhalation valve connected to said breathing compartment, and guard means for protecting said exhalation valve from injury.

5. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, and an exhalation valve associated with said breathing compartment, said exhalation valve comprising two superimposed resilient diaphragms the inner of which is provided with a central opening, means connecting the edges of said diaphragms together at spaced intervals, and means connecting said diaphragm opening with said breathing compartment whereby exhaled air enters between said diaphragms and escapes between said edge-connecting means, the outer of said diaphragms being provided with a plurality of concentric annular corrugations.

6. Breathing apparatus comprising a face-piece, an eye-piece mounted therein, an air hose connected at one end to said face-piece, air-purifying means connected to the other end of said hose, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, and an exhalation valve connected to said face-piece and opening out of said breathing compartment, said exhalation valve comprising two superimposed resilient diaphragms the inner of which is provided with a central opening, means connecting the edges of said diaphragms together at spaced intervals, and means connecting said diaphragm opening with said breathing compartment whereby exhaled air enters between said diaphragms and escapes between said edge-connecting means, the outer of said diaphragms being provided with a plurality of concentric annular corrugations and a plurality of radial corrugations traversing said annular corrugations.

7. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, and a combined exhalation valve and speaking diaphragm member connected to said face-piece and opening out of said breathing compartment, said member comprising two superimposed resilient diaphragms each of which is provided with a central opening, means connecting the edges of said diaphragms together at spaced intervals, a sound-responsive diaphragm mounted in one of said openings, and means connecting the other of said openings with said breathing compartment.

8. A combined exhalation valve and speaking diaphragm member for use with the face-pieces of breathing apparatus, comprising two resilient diaphragms disposed face to face in sealing engagement with their edges joined together at spaced intervals and each being provided with a central opening, a sound-responsive metallic diaphragm mounted in one of said openings with its edge sealed in the surrounding resilient diaphragm, and a tubular fitting extending through the other of said openings and sealed to the surrounding resilient diaphragm, said fitting being adapted to connect said member to a face-piece of breathing apparatus.

9. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, a sound-responsive diaphragm mounted in the mouth portion of said breathing compartment for transmitting the speech of the wearer through the face-piece, and an exhalation valve connected to the bottom of said face-piece.

10. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, the lower front portion of said face-piece being provided with a tubular portion extending into said breathing compartment, a sound-responsive diaphragm mounted in said tubular portion, and an exhalation valve suspended from the bottom of the face-piece and opening into the breathing compartment.

11. Breathing apparatus comprising a face-piece, an eye-piece mounted therein, an air hose connected at one end to said face-piece, resilient means extending across said face-piece and adapted to engage the face of a wearer for dividing the face-piece into eye and breathing compartments sealed from each other, a tube connecting said hose to said eye compartment, a check valve mounted in said hose between said tube and breathing compartment, the lower portion of said face-piece being provided with a tubular portion extending into said breathing compartment with its opposite ends flaring outwardly and with its intermediate portion provided interiorly with an annular recess, a sound-responsive diaphragm mounted in said recess, and an exhalation valve mounted on the bottom of the face-piece.

JOSEPH B. DYM.